March 24, 1953  M. J. FLETCHER  2,632,273

FISHING ROD

Filed March 8, 1949

Inventor

Maurice J. Fletcher

Patented Mar. 24, 1953

2,632,273

UNITED STATES PATENT OFFICE 2,632,273

FISHING ROD

Maurice J. Fletcher, Arlington, Va.

Application March 8, 1949, Serial No. 80,119

4 Claims. (Cl. 43—22)

1

The principal object of this invention is to provide a fishing rod of compact size that can be placed in a coat pocket, the glove compartment of a car or a fishing tackle box but still capable of casting both light and heavy lures with extreme accuracy and ease.

A further object of this invention is to provide a fishing rod having the blade or rod in one piece but capable of telescoping to a minimum length for portability.

A still further object of this invention is to provide a fishing rod which can be left completely rigged with reel, line, and lure ready for immediate use.

A still further object of this invention is to provide a fishing rod which may be cast underhand for fishing brushy streams or lakes.

A still further object of this invention is to provide a fishing rod that may be used for practice casting indoors without requiring special space for the accomplishment.

A still further object of this invention is to provide a fishing rod that is light in weight, durable, efficient and economical in manufacture.

These and other objects will be apparent to those skilled in the art.

My invention consists in the construction, arrangement, and combination of the various parts of the device wherein the objects contemplated are attained as hereinafter more fully set forth, pointed out in my claims and illustrated in the accompanying drawings, in which:

Figures 1, 2:
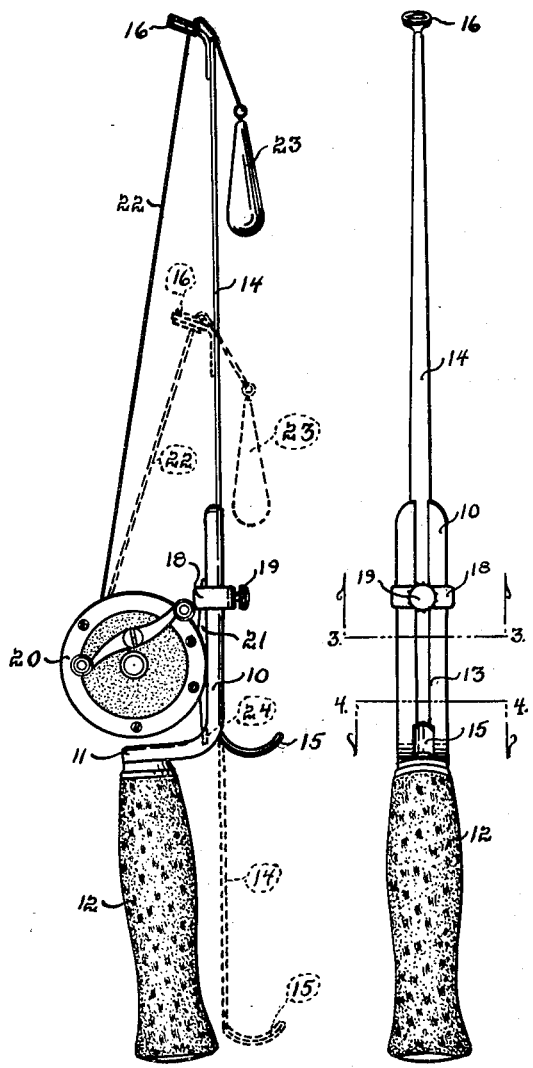
Fig. 1 is a side elevational view of the rod fully extended, with reel, line and lure in operating position and with dotted lines showing the blade in the retracted position.
Fig. 2 is a bottom elevational view of the rod more fully showing its structure.

Fishermen have always sought a rod that was compact and easy to carry and one which would be ready for action when needed but which would, at the same time, permit them to make accurate casts with light lures for a reasonable distance.

2

Many attempts have been made to attain these objectives but these attempts have been failures. Sectionalized rods have been made but these cannot be left rigged and retain their compactness. They must be assembled, aligned and rigged before use. Telescoping tubular rods have been made but are expensive and unstable when extended and require alignment and multiple extension before use. These rods are easily damaged and, if made to telescope to a short enough length to be easily carried, have poor casting action. Several short rods have been devised, some with rigid rod members, but these would only cast extremely heavy lures with no accuracy. Coil springs have been interposed in rod sections with the hope that they might increase the life or yield of the rod but when a light spring is used, the rod vibrates on the cast and sets or offers no resistance when playing a fish. On the other hand, when the spring is strong enough to offer resistance when playing a fish it is worthless in aiding the casting of the lure. These springs also offer other disadvantages in that the line becomes fouled in the coils or, if the coils are covered, the lines and balance of the rod is affected. Neither of the types of coil spring rods can be shortened and left in a unitary assembly. The handle must be detached. None of these rods will permit underhand casting or will they permit accuracy casts in a small space.

I have overcome all of these disadvantages and provide additional desirable characteristics in my fishing rod, which I will explain.

Referring to the drawings, I have used the numeral 10 to designate a reel seat having its rearward end formed upwardly to provide an offset handle support 11 to which is suitably secured a handle 12 as shown in the drawings. The parts 10, 11 and 12 provide the base structure of the rod assembly. Cut longitudinally in the underside of the reel seat is a T slot or bearing way 13 capable of receiving a spring tempered flat blade 14 having its rearward end curved in two planes to form a finger support or casting trigger 15. The blade 14 has its side marginal edges extending parallel for a greater distance than the length of the reel seat 10 and then tapers toward the tip to distribute stresses in the blade and to provide the resiliency necessary for casting while at the same time leaving enough "backbone" in the rod for playing heavy fish. Secured to the small forward end of the blade is an offset casting tip 16 as shown.

I have used the numeral 17 to designate the guide rails along the upper marginal edges of the offset reel seat 10 as shown in the drawings, to assure alignment of the reel.

The numeral 18 indicates a locking ring having an opening therein capable of receiving the reel seat 10 and the supporting flange of a reel. Threaded through the lower portion of the ring 18 is a locking screw 19 which tightens the reel flange and locks the blade 14 to the reel seat 10 as shown in Fig. 3 of the drawings.

Figure 3:
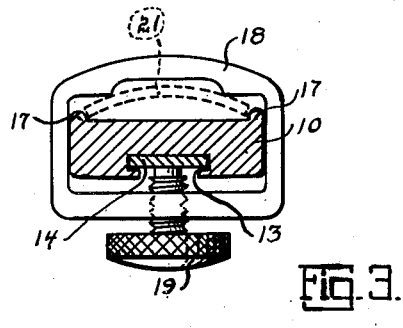
Fig. 3 is an enlarged cross-sectional view of the rod taken on the line 3—3 of Fig. 2.
Figure 4:
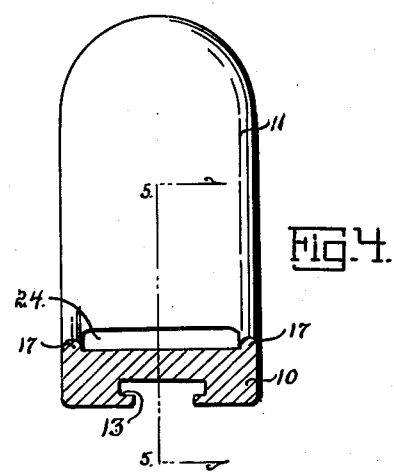
Fig. 4 is an enlarged cross-sectional view of the reel seat of the rod with the blade removed and is taken on the line 4—4 of Fig. 2.
Figure 5:
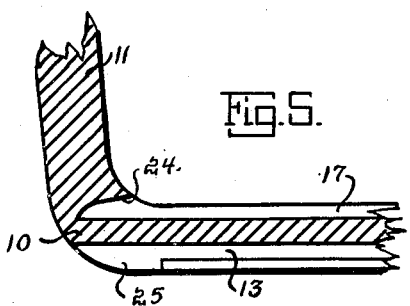
Fig. 5 is an enlarged cross section of the reel seat of the rod taken on line 5—5 of Fig. 4 and more fully illustrates its structure.

Figure 3 shows the inside upper and lower surfaces of the locking ring or slide clamp 18 as spaced from the upper and lower surfaces of the reel seat 10, when the locking ring 18 is in position on the reel seat 10 and the reel supporting flange 21. This permits the entire pressure necessary for clamping of the reel supporting flange 21 to the reel seat 10, and the blade 14 to said seat 10, to be applied substantially along the respective longitudinal central portions of the blade 14 and the flange 21, along the longitudinal axis of the under surfaces of the reel seat 10 and blade 14 of the rod. This insures that the only movement of that portion of the blade 14 adjacent the reel seat 10, will be longitudinal and without a twisting motion of the blade 14 in that portion of the reel seat 10, within which the blade 14 is slidably mounted. Figure 3 of the drawing, shows the specific structural features herein described.

For illustrative purposes I have shown, in Fig. 1, a reel 20 with its supporting flange 21, a line 22 and a casting plug or lure 23 mounted on the fishing rod.

To aid in the description, I have designated by the numeral 24 a recessed retainer in the rear portion of the reel seat 10 for holding the rear edge of the reel supporting flange 21. The numeral 25 designates an enlarged recess entering into the T slot or channel 13 to receive the finger support or trigger 15 when the rod is in an extended position.

The assembly and disassembly of the fishing rod is as follows: The reel seat 10, handle support 11 and handle 12 comprises a complete handle base assembly. The blade 14 with the finger support 15 and tip guide 16 is a component blade or rod assembly and the locking ring 18 with lock screw 19 forms the third component assembly of the rod. Thus the rod comprises three major assemblies, the handle base, the blade or rod assembly and the lock ring assembly.

Figure 6:
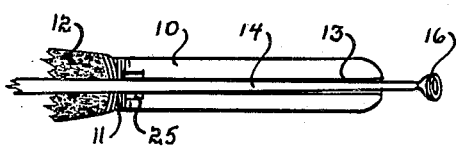
Fig. 6 is a bottom plan view of the reel seat of the rod showing the method of replacing or removing the blade from the handle portion of the device.

To assemble the rod the tip or smaller end of the blade 14 is inserted into the channel of the T slot 13 as shown in Fig. 6 of the drawings, and is then pushed forwardly. The width of the blade and the slope of its taper is such that it will not disengage from the rod when the blade is in the casting or forward position or will it disengage when in the retracted or carrying position shown by dotted lines in Fig. 1 of the drawings. The locking ring 18 is then slipped over the tip, blade and reel seat to complete the assembly of the rod. It will here be noted that the upper inside marginal edge of the lock ring 18 is so formed as to grip the reel supporting flange, as shown in Fig. 3 of the drawings.

To place the reel 20 on the reel seat 10 the rearward end of the reel supporting flange 21 is inserted between the guide rails 17 and into the ramped portion of the retaining recess 24, the lock ring 18 is slid to a position where it encompasses the forward portion of the reel flange 21 and the lock screw 19 tightened. The upper end of the screw 19 enters the channel of the T slot 13 and bears against the blade 14 thereby locking the reel, blade and lock ring in position. To place the rod in a carrying or retracted position, it is only necessary to loosen the screw 19 until the blade can be slipped to the position shown by dotted lines in Fig. 1. The reel, line and lure may be left assembled to the rod in the retracted position, ready for immediate use and the lure may be hooked on to one of the bolsters or spacers of the reel and the rod can be carried in the pocket or the glove compartment of the car so that all that is necessary is to extend the blade to its casting position and begin fishing.

To cast the lure the rod may be held in the normal casting attitude and cast overhand. The energy stored in the spring blade element 14 during the backcast is then imparted to the forward cast to gain momentum in the lure and great distance can be achieved, far more than needed for practical lure or plug casting. This rod also makes possible another style of plug casting heretofore unattainable with conventional or so called short rods, the underhand or "flip" cast. This type of casting is highly desirable where the fishing waters are brushy and where extreme accuracy is desired. Casts of considerable distance are possible with the lure when carried close to the water, and under brush with a very low trajectory available for said lure.

The rod also permits practice casting in the living room of a home without endangering items in the room and by using the commercial three-eighths and five-eighths ounce tournament plugs a great deal of entertainment is possible and an improvement in accuracy of casting technique is experienced.

Thus it will be seen that I have created a fishing rod which attains all of my objectives and presents many more advantages apparent to the fisherman. The rod is light in weight, compact in bulk, strong and durable in construction, will play heavy or light fish with the "life" and sensitivity of a long willowy rod and the "backbone" of a shorter rod. The compactness of the rod makes it unnecessary to carry bulky equipment and tackle boxes making the rod ideal to carry on camping trips and hunting trips for occasional fishing. The rod may be carried in the hunting coat or may be packed in a tackle box for use as an auxiliary rod.

Thus my fishing rod fulfills my objects and overcomes the disadvantages of previous attempts to create a short efficient fishing rod.

Some changes may be made in the construction, arrangement and combination of the various parts of my device without departing from the true spirit and purpose of my invention and it is my intention to cover in my claims any modified forms of structure or use of mechanical equivalents which may reasonably be included within their scope.

I claim:

1. In a device of the class described, a handle, an offset reel seat secured to said handle adapted to seat a reel having a supporting flange and having a longitudinal T slot in its under surface, a reel supporting flange member adapted to be disposed on said reel seat, a flat spring blade having a tip guide and a finger support attached thereon, said flat spring blade capable of being slidably mounted in the T slot in said reel seat and a locking ring having a locking screw threaded thereinto, said locking ring having an opening within which is disposed said reel seat and said spring blade, the upper and lower surfaces of the opening of said locking ring being spaced from the upper and lower surfaces of said reel seat, when said locking ring is in locked position on the reel seat, whereby the entire pressure necessary for clamping of the reel to the reel seat is substantially applied along the central portion of the blade and along the longitudinal axis of the under surface of the reel seat to assure the rigidity of the blade, reel seat and reel flange and capable of locking said flat spring blade and a fishing reel to said reel seat.

2. In a fishing rod, a reel having a supporting flange, a handle member, an offset reel seat secured to said handle, a bearing way formed in said reel seat, and including guide rails disposed along the longitudinal marginal edges of one side of said reel seat and defining a space therebetween which is adapted to receive said reel supporting flange therein, a flexible blade member having a finger trigger formed on one end and having a tip guide on its forward extremity, said flexible blade member slidably engaging said bearing way, and a locking ring assembly capable of securing said reel and said flexible blade to said offset reel seat against relative movement thereto, said locking ring having an opening within which is disposed said reel seat and said spring blade, the upper and lower surfaces of the opening of said locking ring being spaced from the upper and lower surfaces of said reel seat, when said locking ring is in locked position on the reel seat, whereby the entire pressure necessary for clamping of the reel to the reel seat is substantially applied along the central portion of the blade and along the longitudinal axis of the under surface of the reel seat to assure the rigidity of the blade, reel seat and reel flange.

3. In a fishing rod, a handle member, a reel having a supporting flange, a reel seat secured to the forward end of said handle member, offset therefrom and capable of receiving and holding the reel supporting flange, said reel seat containing a longitudinal channel having a cut in its underside, a tapered spring blade assembly capable of being received by said channel in said reel seat and slidably mounted therein, and a locking ring assembly capable of being manually locked to said reel seat, said tapered spring blade assembly and the forward portion of a reel supporting flange, said locking ring having an opening within which is disposed said reel seat and said spring blade, the upper and lower surfaces of the opening of said locking ring being spaced from the upper and lower surfaces of said reel seat, when said locking ring is in locked position on the reel seat, whereby the entire pressure necessary for clamping of the reel to the reel seat is substantially applied along the central portion of the blade and along the longitudinal axis of the under surface of the reel seat to assure the rigidity of the blade, reel seat and reel flange.

4. In combination with a fishing reel, a fishing rod comprising, an offset reel seat capable of supporting said fishing reel, a handle member on said reel seat offset therefrom, a substantially flat spring blade member having its marginal edge tapered inwardly and forwardly, a tip guide on the forward end of said substantially flat spring blade member, means including a locking ring cooperative with said reel seat and said blade member for slidably mounting said flat spring blade member on said reel seat, and for manually locking said reel and said flat spring blade member to said reel seat, said locking ring having an opening within which is disposed said reel seat and said spring blade, the upper and lower surfaces of the opening of said locking ring being spaced from the upper and lower surfaces of said reel seat, when said locking ring is in locked position on the reel seat, whereby the entire pressure necessary for clamping of the reel to the reel seat is substantially applied along the central portion of the blade and along the longitudinal axis of the under surface of the reel seat to assure the rigidity of the blade, reel seat and reel flange.

MAURICE J. FLETCHER.

REFERENCES CITED

The following references are of record in the file of this patent:

UNITED STATES PATENTS

| Number | Name | Date |
|---|---|---|
| D. 156,615 | Fletcher | Dec. 27, 1949 |
| 1,785,027 | Gephart | Dec. 16, 1930 |
| 1,843,714 | Fuller | Feb. 2, 1932 |